Dec. 7, 1954  R. CHAPMAN  2,696,146
SUCTION MOLDING MACHINE
Filed Jan. 18, 1952  4 Sheets-Sheet 1

RALPH CHAPMAN
INVENTOR.

BY
Buckhorn and Cheetham
ATTORNEYS

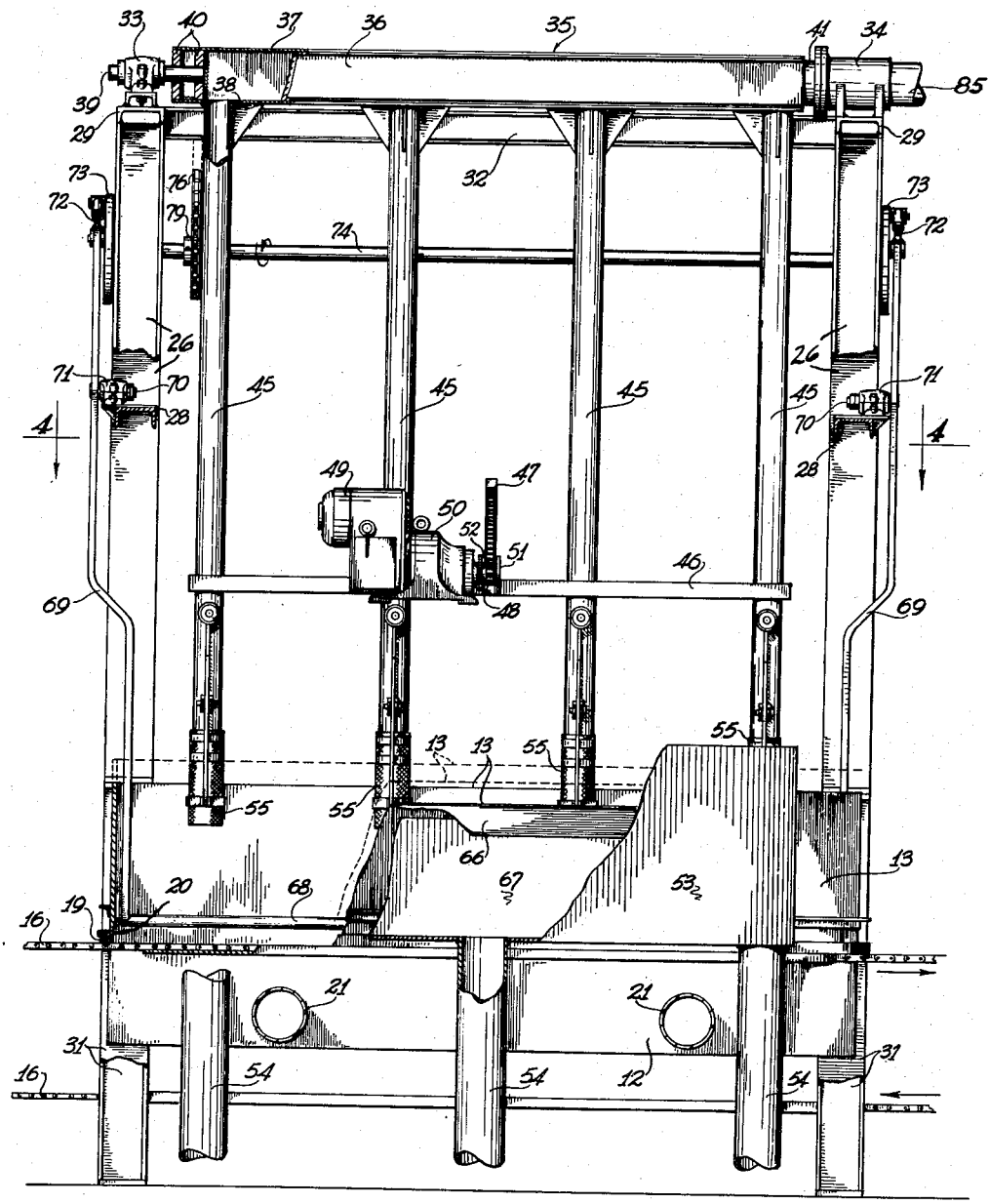

Dec. 7, 1954
R. CHAPMAN
2,696,146
SUCTION MOLDING MACHINE
Filed Jan. 18, 1952
4 Sheets-Sheet 3
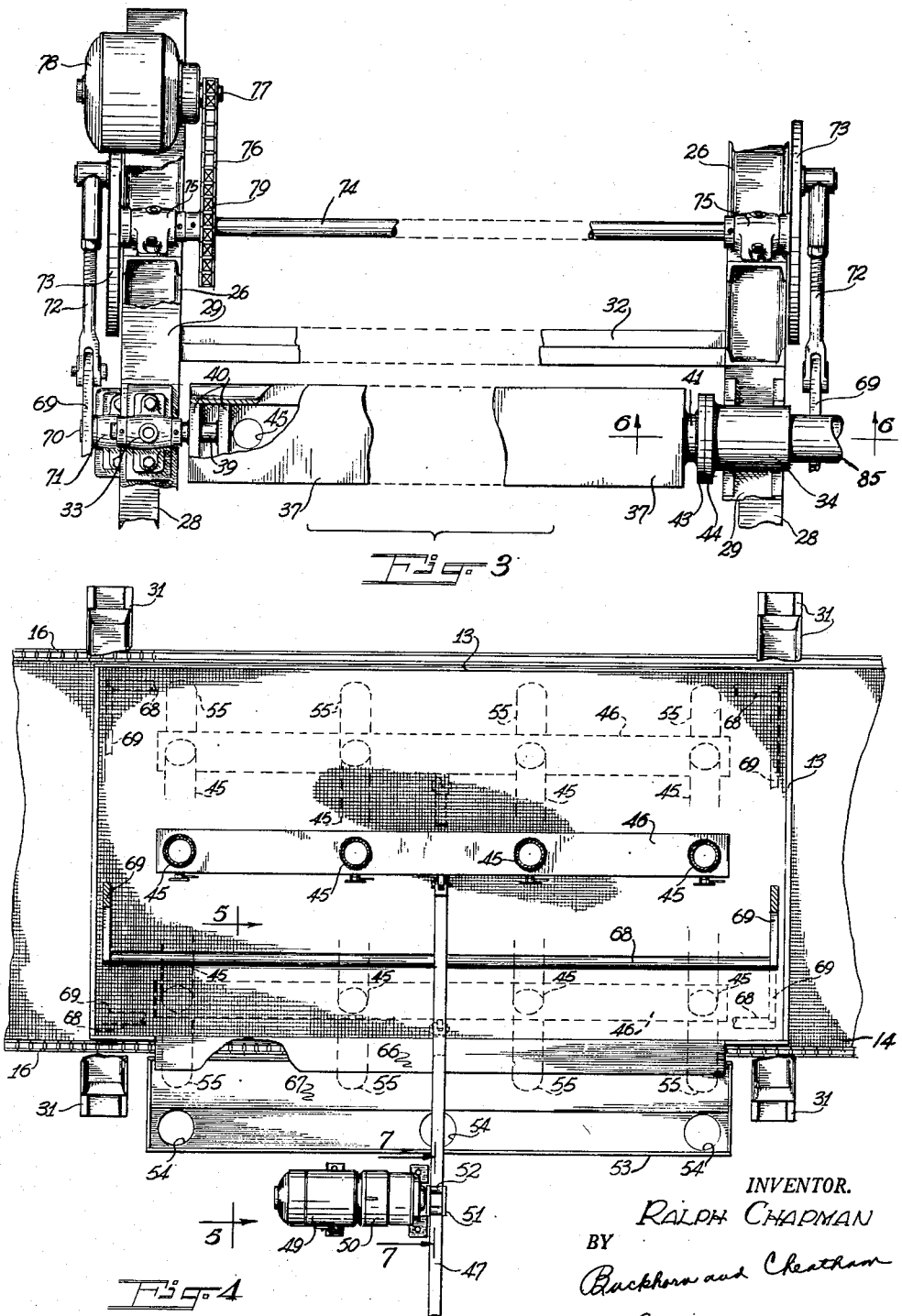
INVENTOR.
RALPH CHAPMAN
BY
Blackhorn and Cheatham
ATTORNEYS Dec. 7, 1954
R. CHAPMAN
2,696,146
SUCTION MOLDING MACHINE
Filed Jan. 18, 1952
4 Sheets-Sheet 4
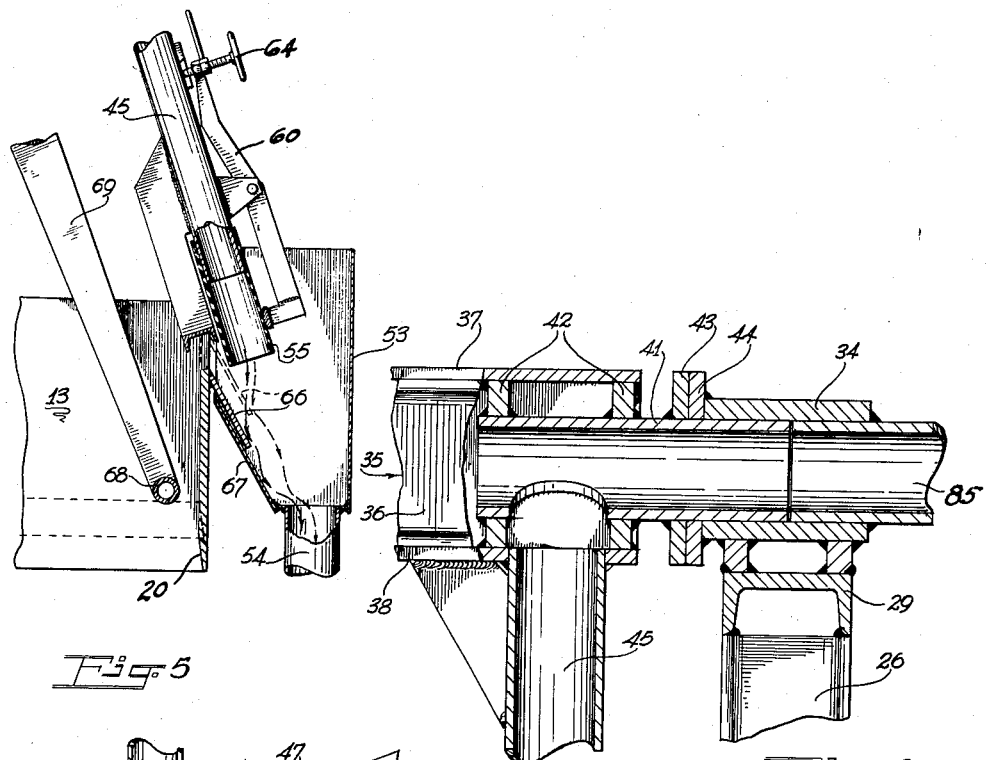
Fig. 5
Fig. 6
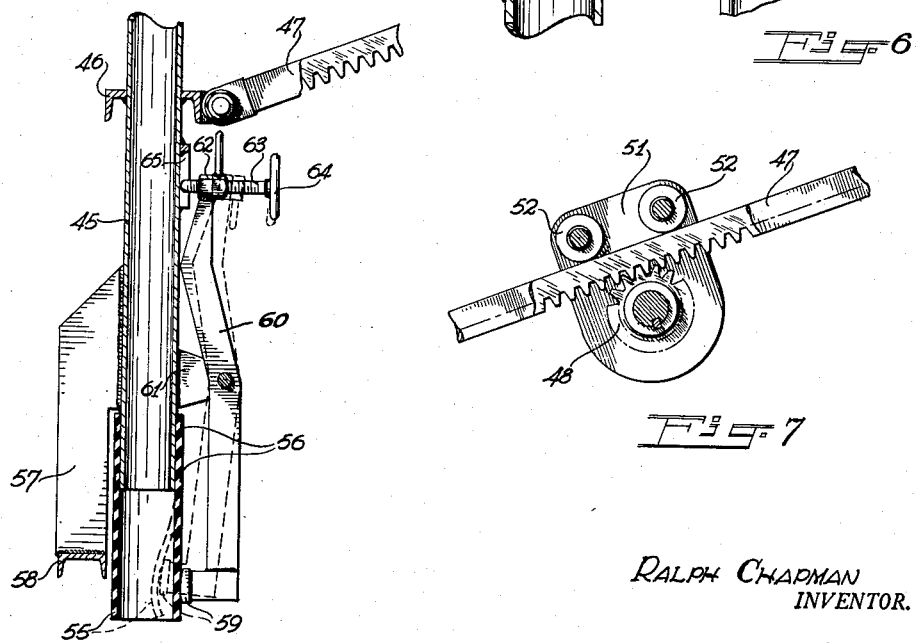
Fig. 8
Fig. 7
RALPH CHAPMAN
INVENTOR.
BY Buckhorn and Cheatham
ATTORNEYS United States Patent Office 2,696,146
Patented Dec. 7, 1954

2,696,146

SUCTION MOLDING MACHINE

Ralph Chapman, Corvallis, Oreg., assignor to Chapman Forest Utilization, Inc., Corvallis, Oreg., a corporation of Oregon Application January 18, 1952, Serial No. 267,090

1 Claim. (Cl. 92—39)

My present invention relates to a suction molding machine for forming fiber mats of relatively large size, particularly fiber mats formed as an intermediate product in the production of fiber boards. Fiber boards are produced by disintegrating wood or other fibrous materials into individual fibers or small slivers of fibers by any suitable process, mixing the fibers with water, with or without the addition of chemicals such as fungicides, fire retardants and binders, draining water from the fibers to form a relatively thick mat of loosely interlaced fibers, and consolidating the mat under heat and pressure. There may be various intermediate steps such as expressing excess water from the wet mat prior to consolidating the same, and after the finished board is removed from the heating press it may be subjected to other steps such as tempering or otherwise treating the board to produce various types and finishes. The wet mat of fibers may be produced in several different types of machines, principally those comprising a continuously traveling, endless, forming screen and those comprising an intermittently traveling forming screen, the former type of machine producing endless mats which are later separated into sheets to provide individual boards prior to or after consolidation and the latter type of machine producing individual mats which are ready to be inserted into the heating press. The present invention is concerned with the latter type of machine including an intermittently progressing forming screen.

In my copending application, Serial No. 20,334, filed April 10, 1948, now abandoned, I disclose a machine of the foregoing type in which the screen travels between separable parts of a molding mechanism including a lower suction box and a reciprocable upper deckle box. A slurry of fibers of the proper consistency is dumped into the forming mechanism, when the deckle box is lowered into sealing engagement with the suction box, from a white water tower such as disclosed in my copending application, Serial No. 66,176, filed December 20, 1948, now U. S. Patent 2,660,935. In the aforesaid application, Serial No. 66,176, there is disclosed means whereby the white water drawn from a charge of slurry which has been dumped into the forming mechanism is returned to the white water tower for subsequent mixing with a batch of water-borne fibers of relatively thick consistency, the mixing being accomplished as the succeeding slurry is dumped into the forming mechanism. In this fashion most of the usable lignins, resins and chemicals which may be salvaged are utilized, there being but a small percentage of waste water from each charging operation which may also be salvaged by returning the same to the fiber forming equipment at some prior stage in the process. I have found that the use of this equipment is satisfactory but that the present invention will achieve all of the advantages thereof while permitting faster production of fiber mats, and more absolute control of the finished product, both as to uniformity of thickness and uniformity of other qualities such as moisture absorption, color, hardness and modulus of rupture. The present invention utilizes a suction box and related apparatus such as disclosed in the aforesaid application, Serial No. 20,334, and certain portions of the white water tower and related apparatus as disclosed in the aforesaid application, Serial No. 66,176, with the distinction that the mixture of the relatively dense fiber slurry and the white water from the preceding mat is accomplished directly in the suction molding apparatus.

One feature of the present invention whereby greater uniformity is achieved is that my prior step of forming batches of relatively dense slurry is eliminated and the measuring of the proper amount of relatively dense slurry into the suction molding machine is accomplished by proper adjustment of the flow through, and the time of utilization of, an intermittently operative pulp feeding device through which a constant flow of dense slurry is maintained.

The principal object of the present invention is to provide means for most rapidly positioning an accurately controlled quantity of slurry of the proper consistency in a large suction molding machine of the type under consideration.

A further object of the present invention is to provide means for mixing dense slurry with returned white water in accurately controlled amounts to bring the consistency of the resulting mixture to a desired point for best results, to maintain the mixture uniform throughout during the draining of water therefrom in the suction molding machine, and otherwise to produce a mat of uniform thickness, fiber density, and other characteristics throughout its extent.

The foregoing and other objects and advantages of the present invention will be more readily apparent from inspection of the accompanying drawings taken in connection with the followig specification wherein like numerals refer to like parts throughout.

In the drawings,

Fig. 2 is a vertical section taken substantially along line 2—2 of Fig. 1, on an enlarged scale, with parts broken away to illustrate details;

Fig. 3 is a plan view showing the upper portion of the machine only;

Fig. 4 is a horizontal section taken substantially along line 4—4 of Fig. 2;

Fig. 5 is a view taken substantially along line 5—5 of Fig. 4 showing the swinging spouts in inoperative position;

Fig. 6 is a vertical section taken substantially along line 6—6 of Fig. 3;

Fig. 7 is a vertical section taken substantially along line 7—7 of Fig. 4; and

Fig. 8 is a vertical section through one of the swinging spouts illustrating the details thereof.

Figure 1:
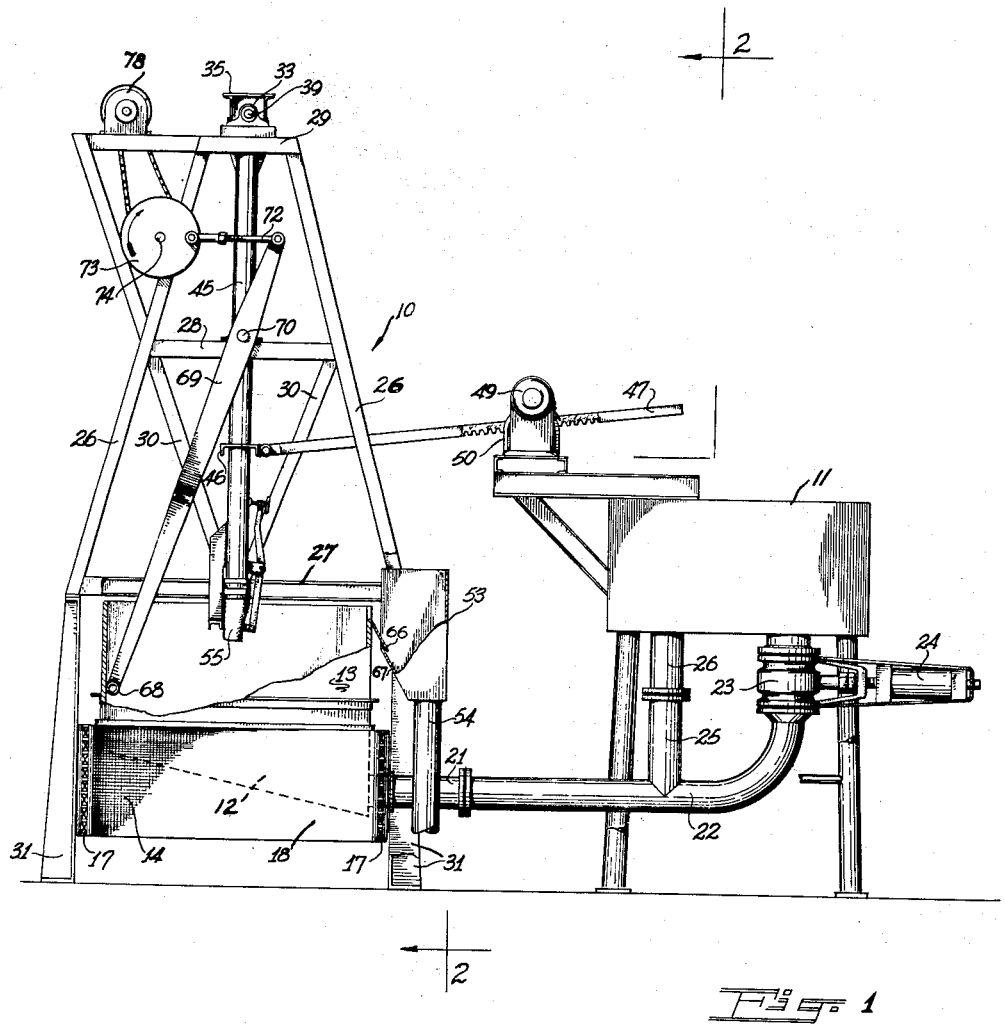
Fig. 1 is a view in side elevation, with parts broken away, of the machine of the present invention including a disclosure of the white water tower used in conjunction therewith.

The present invention comprises two major portions, a suction molding apparatus indicated at 10 and a white water tower indicated at 11. The suction molding apparatus comprises a lower suction box 12 and an upper deckle box 13. The suction box comprises a sloping bottom wall and upright walls terminating in a horizontal plane at their upper edges, the box being rectangular in outline. An endless wire-mesh, forming screen 14 is suitably supported between parallel sprocket chains 16 trained about sprockets 17 fixed to the ends of a horizontally disposed drum 18 at one end of the molding, machine, the drum and other sprockets (not shown) being suitably driven whereby to advance the upper flight of the sprocket chains 16 forwardly from left to right, as seen in Fig. 2, the screen 14 being thereby drawn across the upper edges of the suction box 12. The advance of the forming screen is intermittent, each advance thereof being sufficient to withdraw a formed mat from the molding machine and position it in the next succeeding mechanism (not shown) such as a cold press wherein most of the retained water is expressed prior to placing the wet mat in the hot press for consolidation into a finished board. The deckle box comprises four upright walls forming a rectangular frame, open at top and bottom, and of considerable depth, the lower edges of which press the adjacent portions of the forming screen onto the upper edges of the upright walls of the suction box 12 when the deckle box is lowered. The matching edges of the suction box 12 and of the deckle box 13 support suitable gasket means such as indicated at 19 in Fig. 2 to prevent leakage from between the two halves of the molding machine when slurry is positioned therein. Preferably the inner surfaces of the lower portions of the side walls of the deckle box 13 are outwardly beveled as indicated at 20 in Fig. 2 so that when the deckle box is raised after a wet mat has been formed on the screen the walls of the deckle box will not break away chunks of the loosely formed wet mat. The deckel box 13 is raised and lowered by suitable mechanism (not shown) of any desired type in timed relation to the operation of the forming screen 14 so that when the screen comes to rest the deckle box is lowered into sealing engagement with the suction box, with the screen forming a horizontal division therebetween, and after a wet mat has been formed the deckle box is first raised and then the screen advanced to position the wet mat in the succeeding mechanism. The succeeding mechanisms operate in time with the deckle box so that cold pressing and subsequent removal of the mat from the forming machine are accomplished properly, and when the formed mat has been removed the section of screen occupied by the mat returns with the lower flights of the chains 16 around the drum 18 to be reutilized. The screen may be suitably washed or brushed during its return movement.

A pair of pipes 21 communicate with the interior of the suction box 12 through openings in the right side thereof as viewed in Fig. 1, the pipes 21 being connected to pipes 22 which connect with the white water tower 11 through suitable valve means 23 operated by valve motors 24. Branches 25 of pipes 22 are connected to pipes 26 also communicating with the interior of tank 11. The tank 11 is provided with a vent valve (not shown) and connected to a suction pump by suitable means (not shown) as disclosed in the aforementioned application Serial No. 66,176, whereby a vacuum may be drawn in the tank 11 to withdraw white water from the slurry deposited in the deckle box through the screen 14 into the tank 11 through the valve means 24. Suitable provision is made by means (not shown) as disclosed in the aforesaid application Serial No. 66,176, to retain an accurately measured quantity of white water in the tank 11, the excess being drained away and wasted or returned to the system as desired. Suction is accomplished in timed relation to the actuation of the screen and deckle box and is continued until automatically terminated by breaking of the vacuum when air enters the system through the pipes 21, this being effective to actuate certain controls as disclosed in the above-identified application Serial No. 66,176. Breaking the vacuum also initiates operation of the deckle box raising means and operation of the screen. As soon as the deckle box is lowered to seal off a fresh section of screen the valve means 24 is opened to return the charge of white water retained in the tank 11 into the suction box 12 and through the screen 14 into the lower portion of the deckle box 13. In properly timed relation thereto a charge of dense slurry is deposited in the deckle box 13 and mixed with the returned white water in accordance with the present invention.

In accordance with the present invention, an A-frame is provided at each end of the molding machine, the same comprising main uprights 26, a lower crossbrace 27, intermediate crossbrace 28, upper crossbrace 29, and diagonal crossbraces 30. The uprights 26 and 27 are mounted on suitable posts 31 straddling the molding machine, and the outer ends of the top braces 29 are connected by longitudinal braces such as 32. The top brace 29 on one of the A-frames supports a journal bearing 33 and the top brace 29 on the other A-frame supports an aligned journal sleeve 34. The journal bearing 33 and journal sleeve 34 provide means pivotally to support a head box 35 consisting of a pair of channels 36 forming side walls and a pair of plates 37 and 38 forming top and bottom walls, respectively. A trunnion shaft 39 projecting from one end of the head box is connected to the head box by a pair of filler plates 40 sealing one end of the head box 35, relative longitudinal movement of the head box with respect to the journal bearing 33 being prevented by detachable collars as illustrated in Fig. 2. The opposite end of the head box 35 is pivotally supported by means of a trunnion pipe 41 rotatively retained in the journal sleeve 34 and fixed to a pair of filler plates 42 sealing the end of the head box. A thrust collar 43 on the trunnion pipe 41 rotatively bears against a collar 44 on the end of the trunnion sleeve 34. A pulp supply pipe 85 is welded into the opposite end of the journal sleeve 34.

The head box communicates with four evenly spaced distributor pipes 45 welded to the edges of openings in the lower plate 38, the trunnion pipe 41 being provided with an opening to permit flow through the first of the distributor pipes; the connections of the distributor pipes to the head box being suitably braced by gusset plates as shown. The distributor pipes 45 pass through openings in, and are welded to, a channel bar 46 so as to make a rigid structure of the head box and distributor pipe assembly. A laterally extending rack 47 is pivotally connected to the center of the channel bar 46 and is engaged with a pinion 48 driven by a reversible motor 49 through a reduction gear assembly 50. The rack is retained in meshing engagement with the pinion by a rack guide including a pair of side plates 51 pivotally mounted on the shaft of the gear 48 and retaining a pair of rollers 52 which bear against the smooth upper surface of the rack. The motor 49 is periodically operated in timed relation to the operation of other mechanism by suitable switch means (not shown) to reciprocate the rack once during each cycle of operations, thereby causing the distributor pipes to swing once across the width of the deckle box 13 and return to their initial position. Thick pulp slurry is constantly forced through the head box 35 and distributor pipes 45, the slurry circulating back to the source of supply (not shown) through a spill box 53 at the side of the deckle box and suitable drain pipes 54 leading therefrom. By controlling the rate of flow through the head box 35 and the time which is required to reciprocate the distributor pipes once across the deckle box, the amount of thick slurry deposited in the molding machine may be accurately controlled within wide limits. Fine control of the amount deposited and even distribution may be accomplished by adjusting the flow through each of the distributor pipes 45.

In order to adjust flow through the individual distributor pipes each pipe is provided with adjustable outlet means at its lower end. In the present disclosure the adjustable outlet means comprises a short section of flexible hose 55 clamped onto the lower end of the pipe by bands 56. A bracket plate 57 welded to the pipe 45 above the upper end of the hose 55 supports a short section of channel bar 58 at its lower end against which the protruding end of the hose 55 may be squeezed by a shoe 59 on the lower end of a regulating lever 60 pivotally mounted on a bracket 61 welded to the front surface of the pipe. The upper end of the lever 60 supports a nut 62 in which is threadedly mounted a screw 63 bearing against the surface of the pipe at its inner end and supporting a hand wheel 64 at its outer end. The inner end of the screw 63 is retained between the arms of a U-shaped bar 65 welded to the front surface of the pipe to prevent the screw 63 from slipping around the surface of the pipe.

The lower end of the flexible outlet hose 55 wipes across the upper edge of the wall of the deckle box 13, this wall being lower than the other three walls of the deckle box. A downwardly and outwardly inclined apron plate 66 is welded to the upper edge of the adjacent wall of the deckle box and overlies the upwardly and outwardly inclined outer wall 67 of the drain box 53. The apron plate 66 assures return of the entire flow through the distributor pipes 45 when the pipe assembly swings to its inoperative position as shown in Fig. 5, the construction being such that vertical reciprocation of the deckle box to the extent necessary to permit removal of the wet mat is permitted as shown in dotted outline in Fig. 5.

In order that intimate mixing of the thick pulp deposited in the deckle box through the distributor pipes with the white water returned from the tower through the screen may be accomplished, and in order that the fiber may be maintained uniformly in suspension during the entire time that suction is taking place, means are provided constantly to stir the slurry. Such means comprise a stirring bar 68 extending longitudinally of the deckle box from end to end thereof closely above the wire but at such a height as to permit formation of the fiber mat. The stirring bar 68 is fastened between the ends of a pair of supporting arms 69 each of which is provided with a transverse pivot 70 retained in a journal bearing 71 mounted upon the crossbrace 28. The upper end of the arm 69 is connected to an adjustable pitman 72 pivotally connected to a driving disc 73 at the extreme end of a driveshaft 74 retained in journal bearings 75 mounted on the uprights 26. The shaft 74 is constantly rotated in the same direction by a sprocket chain 76 passing about a sprocket gear 77, driven by a motor 78 through suitable reduction gearing, and a sprocket gear 79 fixed to the shaft 74. The stirring bar 68 is preferably reciprocated at the rate of three or four reciprocations during the time that the distributor pipers are reciprocated once across the deckle box.

It is to be appreciated that the preferred construction comprises a plurality of spaced distributor pipes for spreading the thick slurry across the deckle box in the narrow direction thereof, and that a plurality of spaced outlets is preferred to a continuous slot, for the following reasons. Each of the distributor pipes deposits a stream of slurry which pushes a wave ahead of the distributor pipe to a certain extent, with the slurry flowing back around the moving stream to mingle with the streams from the other distributor pipes. If a continuous slot were provided, a wave of slurry might be built up ahead of the moving distributor apparatus, which wave would be difficult to dampen. In the present apparatus, the tendency to form waves or surges of slurry is eliminated, partially due to the spacing of the distributor pipes and partially due to the stirring action of the stirring rod. It is to be appreciated that the stirring rod reciprocates relatively rapidly and in the direction of movement of the distributor pipes, so as to achieve the greatest effect in dampening any surges of the pulp, and thus achieves uniformity of depth and density of the deposited slurry quickly and prior to applying suction. Likewise, it is a significant factor of the present invention that the distributor pipes travel across the narrow width of the box, thus reducing the time required to traverse the box and further reducing any tendency for the deposited slurry to surge through the box.

Operation

I have not herein illustrated any electrical or other type of control means for achieving the following sequence of operation, such controls being schematically set forth in the above-identified applications and appropriate modifications thereof being within the knowledge of those skilled in the art. In the operation of the present invention the screen comes to rest, whereupon the deckle box is lowered into sealing engagement with the suction box. Immediately the distributor pipes start to swing across the deckle box and then return. Flow through the distributor pipes is uniform and constant, and may be regulated to deposit the desired amount of fibers in the deckle box. Simultaneously with, or preferably slightly before, movement of the distributor pipes starts, the white water tower is placed in communication with the suction box so that the suction box and the lower portion of the deckle box is filled with white water rushing back through the screen. The amount of white water returned is such as to reduce the consistency of the slurry to a desired extent suitable for best results. The stirring bar is constantly in motion so that intimate mixing of the deposited slurry is achieved, and surges of the slurry are reduced to a minimum. As soon as the distributor pipes swing back to discharge into the waste box, suction is established in the white water tower and the water is withdrawn from the slurry through the screen, the result being the deposit of the mat of interlaced fibers on the screen. As soon as suction is broken by air entering the white water tower through the screen, controls operate to seal the water in the white water tower, raise the deckle box and move the screen to present the wet mat to the next mechanism and a fresh section of screen to the suction molding mechanism. During the withdrawal of the water through the screen, the surface of the slurry in the deckle box may be subjected to a spray of white water, pure water, or water mixed with desired chemicals, the principal purpose being to eliminate foaming and thereby create a more uniform product, and a secondary purpose being thereby to incorporate any desired chemical into the mixture. Such sprays are illustrated in the above-identified application Serial No. 20,334, and any suitable equivalent means may be provided. An advantage of the present invention is that, aside from the elimination of a time delay required to drain the charge of slurry and white water into a mixing chamber and to deposit the mixture in the deckle box, there is further considerable saving in time by elimination of the amount of time required completely to drain the mixture from the mixing chamber. In my prior apparatus, illustrated in application Serial No. 20,334, the resulting mat was sometimes spoiled by drips or small streams of slurry running onto the mat after the water had been drained therefrom, unless sufficient time were allowed completely to eliminate the chance of any liquid dripping from the mixing chamber. In the present invention, there is absolutely no possibility of slurry or water dripping onto the finished mat.

Having illustrated and described a preferred embodiment of my invention, it should be apparent to those skilled in the art that the same permits of modification in arrangement and detail. I claim as my invention all such modifications as come within the scope of the appended claim.

I claim:

Apparatus for forming fiber mats from a slurry of fiber comprising a rectangular suction box open at the top and having a horizontal upper edge, an intermittently movable screen disposed horizontally over the upper edge of said suction box and extending beyond the edges thereof, said screen being positioned closely above the upper edge of said suction box, a vertically reciprocable, intermittently movable deckle box above said screen, said deckle box comprising a rectangular frame having high walls and being open at the top and bottom, the lower edge of said frame being horizontal and conforming in outline to the upper edge of said suction box whereby when said deckle box is lowered into engagement with said suction box the deckle box and suction box together form a deep chamber horizontally subdivided by said screen, resilient sealing means along the lower edge of said deckle box and other resilient sealing means along the upper edge of said suction box whereby when said deckle box is lowered into engagement with said suction box liquid may not escape between the edges thereof, said suction box and deckle box being elongated in the direction of movement of said screen, a drain box extending along one side of said deckle box from end to end thereof, a pivotally mounted head box positioned above said deckle box, said head box extending along a pivotal axis horizontally above the longitudinal axis of said deckle box and from end to end thereof, a frame comprising a plurality of pipes extending downwardly from the said head box into the upper part of said deckle box, the lower ends of said pipes being evenly spaced throughout the length of said deckle box, each of said pipes being in open communication with said head box, means continuously to supply slurry to said head box, adjustable flow controlling means associated with each of said pipes, means normally holding said frame in such position that the lower ends of said pipes are positioned above said drain box whereby the flow from said drain box is drained away, and means to swing said frame once across said deckle box and back to its normal position when said deckle box is lowered into sealing engagement with said suction box whereby to deposit a charge of slurry in said chamber.

References Cited in the file of this patent
UNITED STATES PATENTS

| Number | Name | Date |
|---|---|---|
| Re. 5,113 | Bunce | Oct. 29, 1872 |
| 1,605,491 | Williams | Nov. 2, 1926 |
| 1,712,852 | Streeter | May 14, 1929 |
| 1,847,269 | Schur | Mar. 1, 1932 |
| 1,918,782 | Randall | July 18, 1933 |
| 1,971,296 | Carpenter | Aug. 21, 1934 |
| 2,369,608 | Salvaneschi | Feb. 13, 1945 |
| 2,544,007 | Cook | Mar. 6, 1951 |

FOREIGN PATENTS

| Number | Country | Date |
|---|---|---|
| 455,601 | Great Britain | Oct. 19, 1936 |
| 545,224 | Great Britain | May 15, 1942 |